4 Sheets—Sheet 2.

W. N. WHITELEY.
Harvester.

No. 197,192. Patented Nov. 13, 1877.

WITNESSES

INVENTOR
W. N. Whiteley
By his atty

N. PETERS, PHOTO-LITHOGRAPHER, WASHINGTON, D C.

4 Sheets—Sheet 3.
W. N. WHITELEY.
Harvester.
No. 197,192. Patented Nov. 13, 1877.
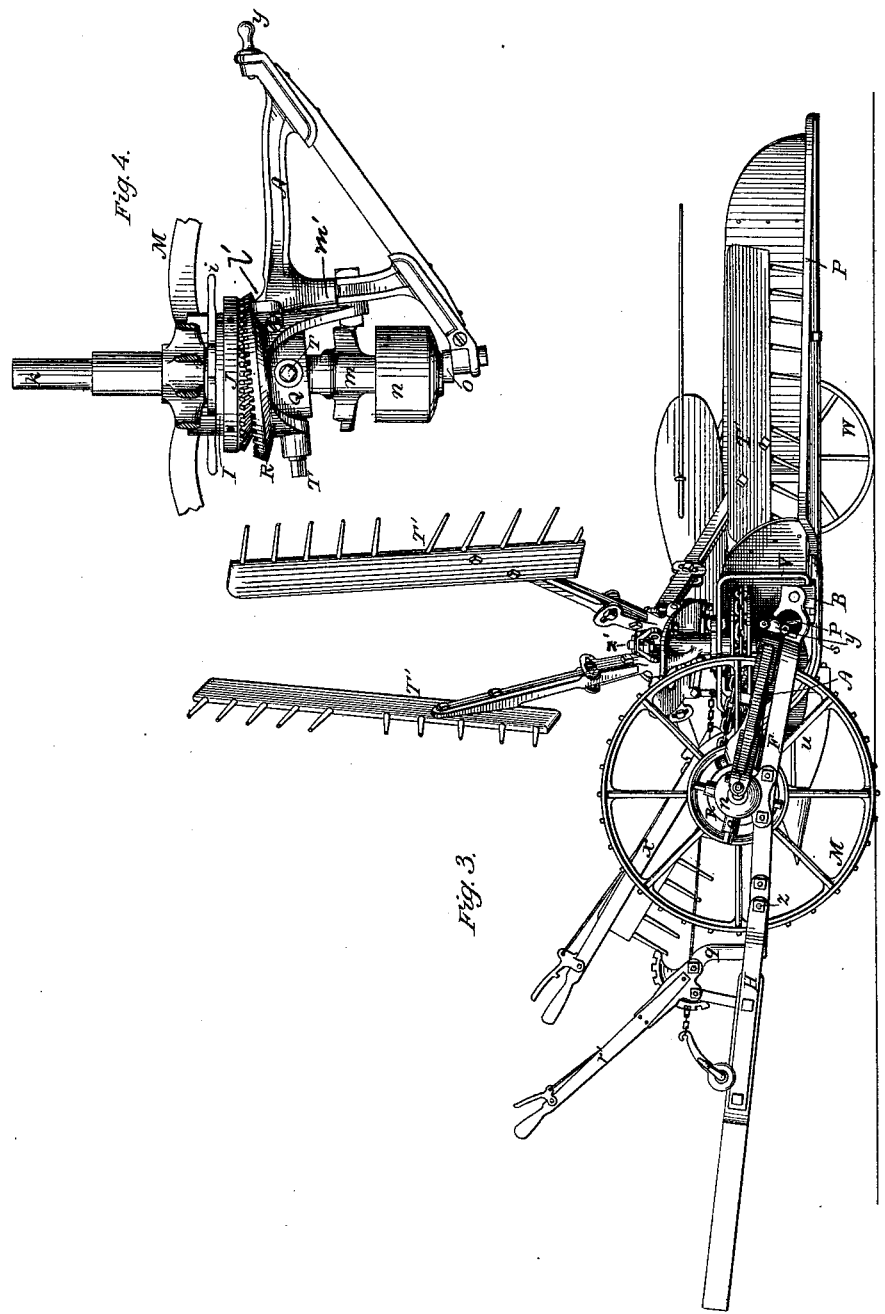
WITNESSES
INVENTOR
N. PETERS, PHOTO-LITHOGRAPHER, WASHINGTON, D C.

4 Sheets—Sheet 4.
W. N. WHITELEY.
Harvester.
No. 197,192. Patented Nov. 13, 1877.
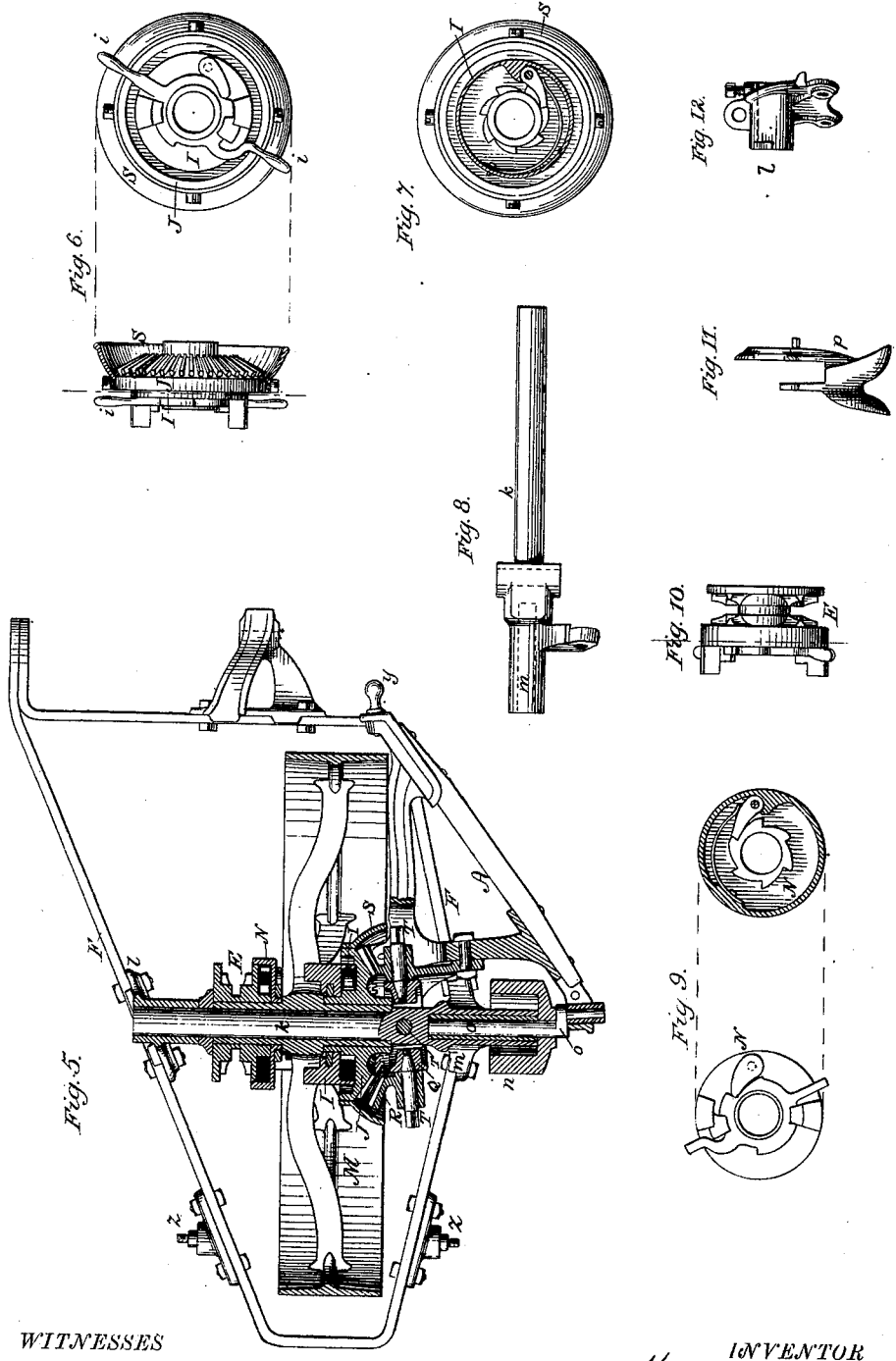
WITNESSES
INVENTOR

UNITED STATES PATENT OFFICE.

WILLIAM N. WHITELEY, OF SPRINGFIELD, OHIO.

IMPROVEMENT IN HARVESTERS.

Specification forming part of Letters Patent No. 197,192, dated November 13, 1877; application filed April 25, 1877.

*To all whom it may concern:*

Be it known that I, WILLIAM N. WHITELEY, of the city of Springfield, county of Clarke, and State of Ohio, have invented certain new and useful Improvements on Reapers and Mowers; and I do hereby declare that the following is a full and correct description thereof, reference being had to the accompanying drawings, and to the letters and figures of reference thereon, wherein—

Figure 1:
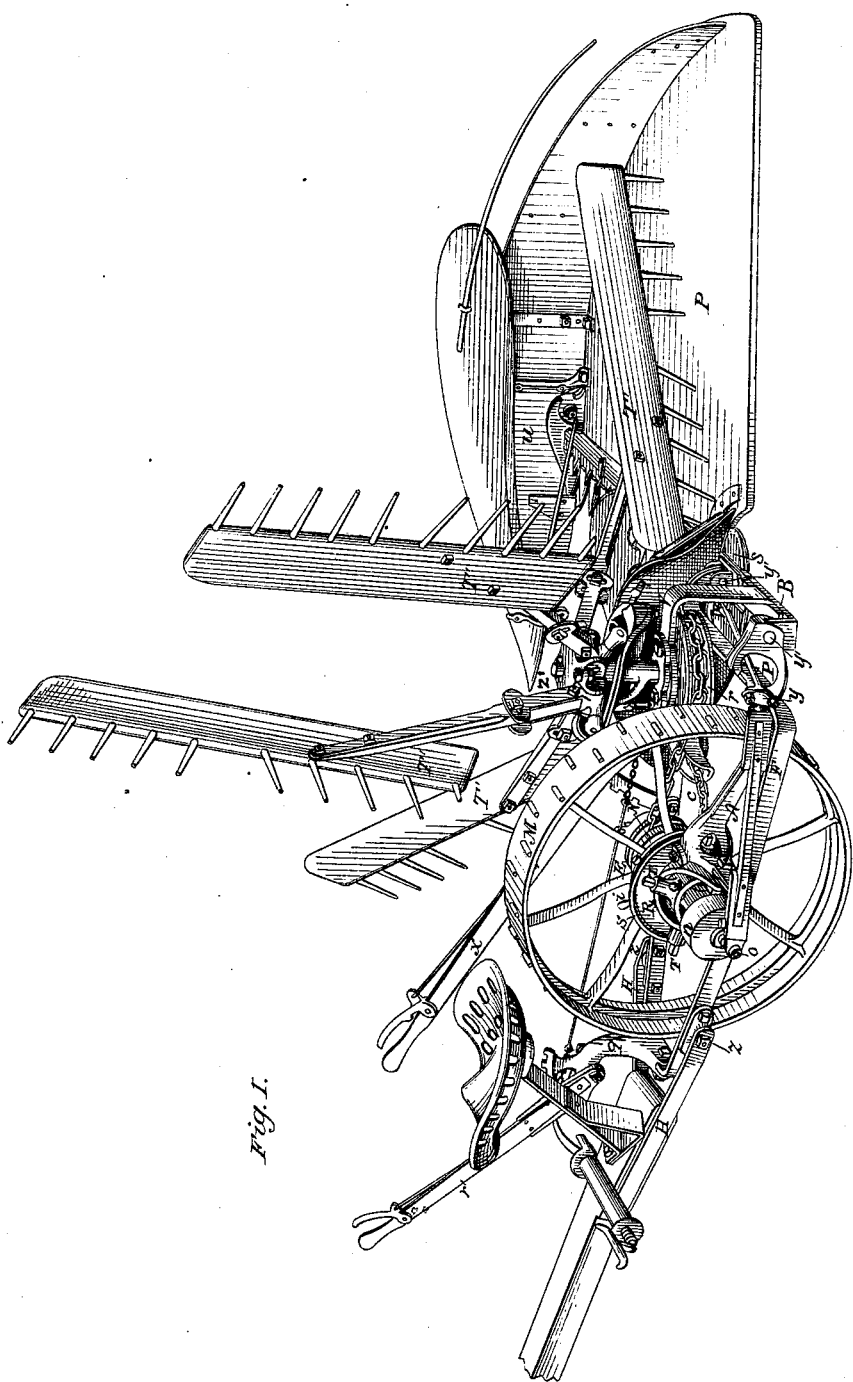
Figure 2:
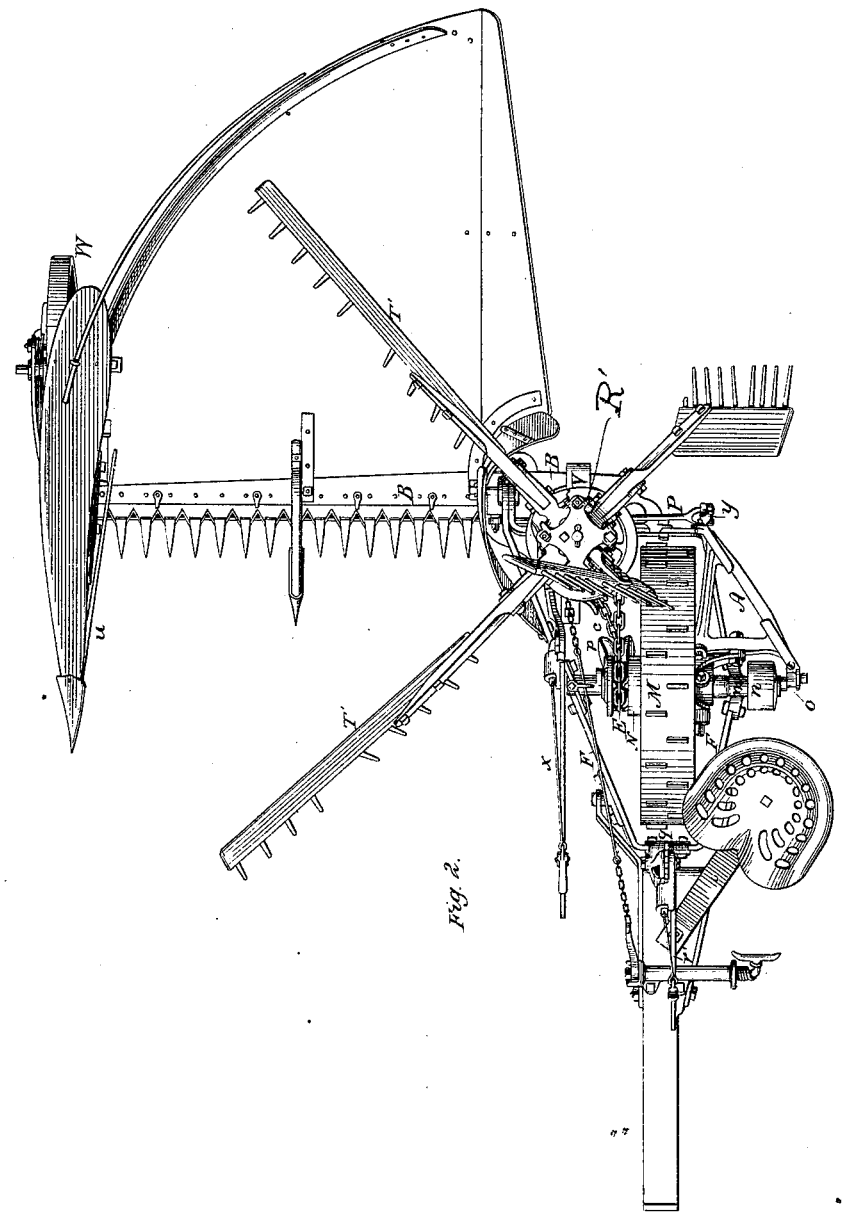

Figure 1 is a perspective view of my reaper. Fig. 2 is a plan of the same. Fig. 3 is a side elevation of the same. Fig. 4 is a detached plan of the oscillating gear. Fig. 5 is a horizontal section through the main-wheel axis. Fig. 6 is a plan and elevation of the driving-pinion loose on the axle. Fig. 7 is a plan of clutch side of same. Fig. 8 is a plan of main axle. Fig. 9 represents the chain-wheel clutch. Fig. 10 shows the chain-wheel. Fig. 11 represents the chain guard and guide. Fig. 12 represents a bracket on the outer end of the main axle.

The shaft $k$ is stationary, and secured to the frame F by means of the boxes $l$ and $m$. Between the boxes $l$ and $m$, and rotating on shaft $k$, is fitted the master-wheel M. The outside of the hub of master-wheel is turned off at both ends, and on the outer end is fitted the outside differential gear-wheel J. The wheel J revolves freely on the hub of wheel M, and is driven by means of a coupling-plate, I, and a pawl. The pawl can be disengaged by means of handle $i$. On box $m$ is secured the gimbal-ring Q by means of the pins T. On the gimbal-ring Q is secured the differential wheel R.

The four pins T form a universal joint, the intersection of the cross-axis being common with the axis of the shaft $k$, which allows the internal differential gear R to roll on the wheel J and give motion to the vibrating arm A, which is firmly secured to the wheel R.

The oscillating gear-wheel R is constructed with two lugs, $l'$, projecting radially from its outer periphery, and an arm, $m'$, extending in a line parallel with its axis; and the vibrating frame A is constructed with feet straddling over said wheel, so as to stand upon said lugs and be secured thereto by bolts, as shown. The frame A has also an arm or cross-bar, which seats upon the arm $m'$, and is secured thereto by bolts, whereby these parts are firmly secured together without shearing strains upon the holding-bolts.

In the outside end of the box $m$ is fitted a small crank-shaft, $o$, which is connected to the arm A by means of its crank-pin. On crank-shaft $o$ is fitted a fly-wheel, $n$. The office of the crank-shaft $o$ and fly-wheel $n$ is to control the motion of the wheel R and relieve the thrust of the knife at the time of the stroke. In the end of the vibrating arm A a ball-pin, $y$, is attached, to constitute a joint for the pitman P, which is connected to the knife-bar.

A chain-wheel, E, is fitted to the inner end of the master-wheel hub, and is driven by means of a coupling-plate, N, and pawl, and is connected by the chain $c$ to the chain-wheel $r$, which is secured to the rake-shaft.

The rake's guide-cam is mounted upon the arch V, which is firmly bolted to finger B and shoe $s$.

A lever, $x$, is bolted to the front end of the shoe $s$, and by means of said lever the cutter-bar is tilted, and held in the required position by means of a spring-bolt fitting into notches on a rack-bar bolted to the frame F.

The cutter-bar B is attached to the frame by means of pins $y'$ and rolls upon them. On both sides of frame F are bolted tongue-trunnions $z$, around which the tongue oscillates, and to which the tongue is connected by the hounds H.

On the front end of frame F the rack-stand $q$ is bolted to carry a lever, $r'$. The lever $r'$ is connected with the tongue by a link, and when operated causes the tongue to roll on the trunnions $z$, and so raise or lower the cut. On the inside of the master-wheel M, and fitted on shaft $k$, is a picker or tightening-block, $p$, which serves to tighten the chain, when slackened, by throwing the knife-guards downward, and also is useful in freeing the links from the chain-wheel E. On the top of cam-shaft $z'$ a rake-head, R', is secured, and carries four rakes, T'. The rakes are arranged to rake the grain from the platform automatically once or twice at each revolution of the master-wheel, as may be required; or, by taking out a trip-pin, the driver may, at will, cause the rakes to suspend their operation.

On the back of cutter-bar B is bolted platform P, which receives the grain, and from which it is raked off into gavels, as may be desired. On the outer end of cutter-bar B is secured the divider $u$, which divides the grain. The weight of the outer end of the cutter-bar and platform is carried by the grain-wheel W, which can be raised or lowered to suit the height of the cut.

The differential gear-wheels J and R are partly covered and fully protected from the entrance of mud or dirt dropping from the edge of the wheel M by means of a shield-plate, S, which, for convenience of attachment, is made in two parts, bolted to the edge of the wheel J, as shown.

I claim—

1. The combination of a vibrating frame, F, having boxes $l\ m$ to support a shaft, $k$, for the master-wheel, differential gear-wheels J R (one of which oscillates) upon the shaft outside of said main wheel, crank $o$, outside of said frame, and a vibrating frame, A, whereby motion is transmitted to the cutters.

2. The shaft $k$, resting at one end in the box, combined with the box $m$, to receive the other end of said shaft, said box $m$ being provided with cross-bearings for the gimbals T T, and with an end socket to receive the crank-shaft $o$.

3. The differential wheels J R, one of which oscillates, combined with the sectional shield-plate secured to the pawl-case, to prevent dirt, &c., from dropping off the wheel into said gearing.

4. The oscillating gear R, provided with lugs $l$, radiating from the center, and projecting beyond the outer periphery of said wheel, and arm $m'$, parallel with the axis of said wheel, combined with the vibrating frame A, constructed with straddling feet adapted to stand upon said lugs, and an arm or cross-bar adapted to seat upon the arm $m'$, the whole to be secured there by bolts, as set forth.

WILLIAM N. WHITELEY.

Witnesses:
 T. I. THOMPSON,
 R. D. O. SMITH.